(12) United States Patent
Kato et al.

(10) Patent No.: US 7,939,212 B2
(45) Date of Patent: May 10, 2011

(54) FLUX CONTROL APPARATUS AND FUEL CELL SYSTEM

(75) Inventors: Hiroaki Kato, Toyota (JP); Kazumasa Takada, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1364 days.

(21) Appl. No.: 11/294,553

(22) Filed: Dec. 6, 2005

(65) Prior Publication Data

US 2006/0159970 A1    Jul. 20, 2006

(30) Foreign Application Priority Data

Dec. 24, 2004  (JP) ................................. 2004-374443

(51) Int. Cl.
*H01M 8/04* (2006.01)
*H01M 8/06* (2006.01)

(52) U.S. Cl. ......... 429/428; 429/443; 429/433; 429/408

(58) Field of Classification Search .................... 429/25, 429/428, 443, 433, 408
See application file for complete search history.

(56) References Cited

U.S. PATENT DOCUMENTS

| 5,662,184 | A | * | 9/1997 | Riemer et al. | ............... | 180/65.1 |
| 5,771,476 | A | * | 6/1998 | Mufford et al. | ............... | 701/22 |
| 6,461,751 | B1 | * | 10/2002 | Boehm et al. | ............... | 429/13 |

FOREIGN PATENT DOCUMENTS

| JP | 09-092312 | 4/1997 |
| JP | 2000-163134 | 6/2000 |
| JP | 2003-168467 | 6/2003 |
| JP | 2004-95226 | 3/2004 |
| JP | 2004-213945 | 7/2004 |

OTHER PUBLICATIONS

Japanese Office Action dated Jun. 15, 2010 w/English translation.

* cited by examiner

*Primary Examiner* — Patrick Ryan
*Assistant Examiner* — Julian Mercado
(74) *Attorney, Agent, or Firm* — Oblon, Spivak, McClelland, Maier & Neustadt, L.L.P.

(57) ABSTRACT

A flux control apparatus includes an outlet pressure detector for detecting an outlet pressure of a fluid at an outlet of a fluid flow apparatus driven by a drive source for feeding the fluid from an inlet of the fluid flow apparatus and letting the fluid flow out from the outlet of the fluid flow apparatus, a drive amount detector for detecting an amount of drive of the drive source, an estimated flux-calculating apparatus for calculating a flux of the fluid flowing from the fluid flow apparatus as an estimated flux on the basis of the pressure of the fluid and the amount of drive, a control amount-calculating apparatus for calculating an amount of control for the fluid flow apparatus on the basis of the estimated flux and a target flux, and a control apparatus for controlling the drive source on the basis of the amount of control.

16 Claims, 6 Drawing Sheets

FLUX CONTROL APPARATUS AND FUEL CELL SYSTEM

CROSS REFERENCE TO RELATED APPLICATIONS

This application is based on and claims priority under 35 U.S.C. §119 to Japanese Patent Application 2004-374443, filed on Dec. 24, 2004, the entire content of which is incorporated herein by reference.

FIELD OF THE INVENTION

The present invention generally relates to a control apparatus for a fluid flow apparatus, and a fuel cell system. More particularly, the present invention pertains to a control apparatus for a fluid flow apparatus driven by a motor for feeding a fluid from an inlet and letting the fluid flow out from an outlet, and a fuel cell system.

BACKGROUND

A control apparatus for a fluid flow apparatus driven by a motor for feeding a fluid from an inlet and letting the fluid flow out from an outlet is conventionally known. For example, a control apparatus provided in a fuel cell system is conventionally known.

JP2004-95226A (document 1), proposing a fuel cell system, describes an example of such control apparatus. According to this document, the fuel cell system includes an oxidative gas-supplying apparatus (compressor) 5 for supplying an oxidative gas to the fuel cell body 6, an oxidative gas-flux sensor 7 for detecting a flux of the oxidative gas supplied from the oxidative gas-supplying apparatus 5 to the fuel cell 6, a current sensor 8 for detecting an output current from the fuel cell 6, and a controller 15 for controlling the flux of the fuel gas and the oxidative gas. In the fuel cell system, in a normal state, the flux of the oxidative gas is controlled with high accuracy by feedback controls utilizing a detected value of oxidative gas flux QS detected by the oxidative gas-flux sensor 7. In contrast, in an abnormal state, in which the detected value of the oxidative gas-flux sensor 7 deviates from a normal range determined on the basis of operation conditions of the fuel cell, the flux of the oxidative gas is controlled by a feed forward control, being switched from the feedback control.

A target air flux-calculating portion 23 calculates a target air flux on the basis of a required amount of electricity generation. An estimated air flux-calculating portion 24 calculates an estimated air flux on the basis of a current of generated electricity of the fuel cell 6 detected by the current sensor 8. An air flux sensor-normal range-calculating portion 25 calculates a normal range of the detected value detected by the air flux sensor 7, utilizing the estimated air flux calculated by the estimated air flux-calculating portion 24, on the basis of operation conditions of the fuel cell. An air flux sensor-monitoring portion 26 monitors whether the detected value detected by the air flux sensor 7 is within the normal range or not. A feed forward (FF) control portion 27 calculates, on the basis of the target air flux QE calculated by the target air flux-calculating portion 23, with referencing control maps or the like recorded in advance, a command value of rotational speed of the compressor 5 during the feed forward control. A feedback (FB) control portion 28 calculates, on the basis of the target air flux QE calculated by the target air flux-calculating portion 23 and the detected value of the air flux detected by the air flux sensor 7, a command value of rotational speed [rpm] of the compressor 5 during the feedback control.

JP2004-213945A (document 2), proposing a fuel cell system, describes another example of a control apparatus. As described in the document, a fuel cell system 10 includes a fuel cell 12 and a reformer 14. For supplying a fuel gas, air, and/or purified water to the fuel cell 12 and the reformer 14, pumps (or blowers, motors) 16a to 16c, 18a and 18b, 24a and 24b are provided. These pumps are controlled by a computer (not illustrated), utilizing a feedback control for controlling the flux. In other words, each pump includes a sensor (not illustrated) for detecting the flux of each pump. The flux detected by each sensor is fed back to the computer. The computer transmits, for example, a value for pulse width modulation (PWM value) to the pumps and/or motors so that each flux becomes the target value. For the feedback control, a control output value, for example, a value for a pulse width modulation (PWM value), is transmitted to each pump (supplying apparatus). On the basis of the control output value, a time until the supplying apparatus will become uncontrollable is calculated. Then, a rest lifetime in which the supplying apparatus is controllable is calculated. When the rest lifetime becomes larger than a set rest lifetime, the computer gives an alarm.

Further, JP2000-163134A (document 3), proposing a flux control valve and a fuel cell system, describes another example of a control apparatus. As described in the document, a flux control valve provided in a fuel cell system includes a temperature detecting means 104 (temperature sensor 3) for detecting a temperature of a fluid, a pressure detecting means 101 (pressure sensor 4) for detecting a pressure of the fluid, a pressure difference detecting means 102 (pressure difference sensor 5) for detecting a difference between pressures at a first side port and a second side port, a means 108 (motor 6) for controlling a degree of opening of the valve, a means 103 (sensor for detecting a degree of opening 20) for detecting a degree of opening of the valve, a means 105 for calculating an amount of mass flow of the fluid on the basis of the detected pressure, the detected pressure difference, and the detected degree of opening, and a means 107 for repeatedly performing the control and calculation so that the calculated mass flow becomes a set value. The means 105 for calculation calculates an effective cross-sectional area S of the valve on the basis of a pressure $P_2$ at the second side port, a pressure difference $\Delta P$ between a pressure at the first side port and the second side port, and the degree of opening, utilizing a map data stored in a read only memory (ROM). Then, the means 105 for calculation calculates a mass flow of air on the basis of the calculated effective cross-sectional area S of the valve, the pressure $P_2$ at the second side port, the pressure difference $\Delta P$ between pressures at the first side port and the second side port, and a density $\sigma$ of the fluid, utilizing equations 1 and 2 described in the document 3.

In the fuel cell described in the document 1, in a normal state, the compressor 5 is controlled by the feedback control, utilizing the detected value of the oxidative gas flux QS detected by the oxidative gas-flux sensor 7. In an abnormal state, the oxidative gas flux is controlled by the feed forward control on the basis of the target air flux QE calculated by the target air flux-calculating portion 23 on the basis of the required amount of electricity generation, referencing a control map or the like stored in advance. In such a feedback control, because a flux sensor is required, an apparatus tends to become large in size, and high in cost. In addition, in the feed forward control, because the command value of the rotational speed is calculated on the basis of only the target air flux QE, there is a danger that the command value of the rotational speed becomes inaccurate, and a desired oxidative gas flux cannot be supplied with high accuracy.

In the fuel cell described in the document 2, the pumps are controlled by the feedback control, utilizing detected results detected by the sensor for detecting the flux. Accordingly, similarly to the document 1, because the flux sensor is required, an apparatus tends to become large in size, and high in cost.

In the flux control valve and the fuel cell system described in the document 3, the mass flux of the fluid is calculated on the basis of the detected pressure, the detected pressure difference, and the detected degree of opening without utilizing costly mass flow meter. The flux is thus controlled accurately. The mass flux of the fluid is calculated as follows. Firstly, the effective cross-sectional area S of the valve is calculated on the basis of the pressure $P_2$ at the second side port, the difference $\Delta P$ between pressures at the first side port and the second side port, and the detected degree of opening, referencing the map data stored in the ROM. Then, the mass flux of air is calculated on the basis of the calculated effective cross-sectional area S of the valve, the pressure $P_2$ at the second side port, the difference $\Delta P$ between pressures at the first side port and the second side port, and the density $\sigma$ of the fluid, utilizing equations 1 and 2 described in the document 3. This method for calculating the mass flux can be efficiently applied to a flux control valve. However, this method may not be efficiently applied to a fluid flow apparatus.

A need thus exists for a fluid flow control apparatus which enables to control a flux of a fluid with high accuracy without utilizing high-cost and large-size mass flow meter, and a fuel cell system including the fluid flow control apparatus. The present invention has been made in view of the above circumstances and provides such a control apparatus for a fluid flow apparatus and such a fuel cell system.

SUMMARY OF THE INVENTION

According to an aspect of the present invention, a flux control apparatus includes an outlet pressure detector for detecting an outlet pressure of a fluid at an outlet of a fluid flow apparatus driven by a drive source for feeding the fluid from an inlet of the fluid flow apparatus and letting the fluid flow out from the outlet of the fluid flow apparatus, a drive amount detector for detecting an amount of drive of the drive source, an estimated flux-calculating apparatus for calculating a flux of the fluid flowing from the fluid flow apparatus as an estimated flux on the basis of the pressure of the fluid and the amount of drive, a control amount-calculating apparatus for calculating an amount of control for the fluid flow apparatus on the basis of the estimated flux and a target flux, and a control apparatus for controlling the drive source on the basis of the amount of control.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
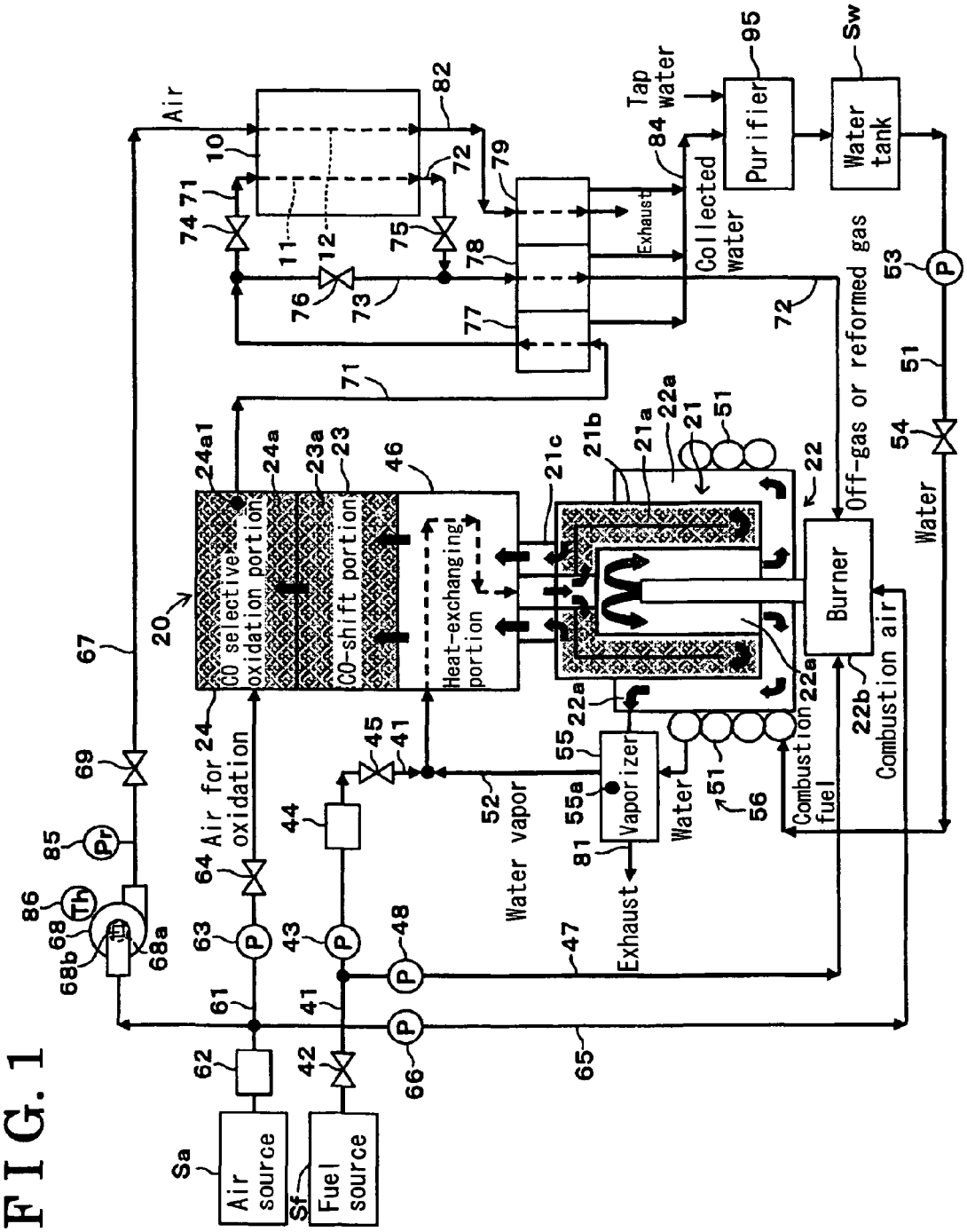
FIG. 1 represents a schematic diagram illustrating a fuel cell system according to an embodiment of the present invention.

An embodiment of the present invention will be explained with reference to drawing figures. FIG. 1 represents a schematic diagram illustrating an overview of a fuel cell system. As illustrated in FIG. 1, the fuel cell system includes a fuel cell 10 and a reforming apparatus 20 for generating hydrogen gas required for the fuel cell 10. The fuel cell 10 includes an anode 11 and a cathode 12. The fuel cell 10 generates electricity utilizing a reformed gas supplied to the fuel electrode 11 and air (cathode air) supplied to the air electrode 12.

The reforming apparatus 20 includes a reforming portion 21 for reforming a fuel, a carbon monoxide-shift reaction portion (referred to a CO-shift portion later) 23 for diminishing carbon monoxide contained in the reformed gas introduced from the reforming portion 21, and a carbon monoxide selective oxidation portion (referred to a CO selective oxidation portion later) 24 for further diminishing carbon monoxide contained in the reformed gas introduced from the CO-shift portion 23. For fuel, natural gas, liquefied petroleum gas (LPG), coal oil, gasoline, methanol, or the like, can be employed. In the embodiment, natural gas is employed.

The reforming portion 21 is formed to be a cylinder. The reforming portion 21 includes a reaction chamber 21b in which a reforming catalyst 21a is filled. In the reforming portion 21, a combustion portion 22 is provided. The combustion portion 22 includes a heat chamber 22a provided close to the reaction chamber 21b for heating the reaction chamber 21b and a burner 22b for supplying combustion gas of high temperature to the heat chamber 22a.

A fuel supply-pipe 41 connected to a fuel source Sf (town gas pipe or the like) is connected to the reaction chamber 21b. A fuel for reform (raw fuel gas) is supplied from the fuel source Sf. A first fuel valve 42, a fuel pump 43, a desulfurizer 44, a second fuel valve 45, and a heat-exchanging portion 46 are provided at the fuel supply-pipe 41 in series from upstream. The first fuel valve 42 and the second fuel valve 45 open/close the fuel supply-pipe 41 on the basis of commands from the control apparatus 30. The fuel pump 43 pumps the fuel from the fuel source Sf into the reaction chamber 21b of the reforming portion 21. The fuel pump 43 controls the amount of the fuel supplied to the reaction chamber 21b on the basis of commands from the control apparatus 30. The desulfurizer 44 removes sulfur (sulfur compound or the like) contained in the fuel. In the heat-exchanging portion 46, the fuel is heated in advance by changing heat with the reformed gas of high temperature flowing from the reforming portion 21 to the CO-shift portion 23, and supplied to the reaction chamber 21b of the reforming portion 21. Sulfur is removed from the fuel by the desulfurizer 44. The fuel is heated in advance by the heat-exchanging portion 46, and is supplied to the reaction chamber 21b.

A vapor supply-pipe 52 connected to a vaporizer 55 is connected to the fuel supply-pipe 41 between the second fuel valve 45 and the heat-exchanging portion 46. Vapor supplied from the vaporizer 55 is mixed into the fuel for reform. The fuel is supplied to the reaction chamber 21b of the reforming portion 21. A water supply-pipe 51 connected to a water tank Sw serving as a water source is connected to the vaporizer 55. A water pump 53 and a water valve 54 are provided at the water supply-pipe 51 in series from upstream. The water pump 53 pumps water from the water tank Sw into the vaporizer 55. The amount of the water supplied to the vaporizer 55 is controlled on the basis of commands from the control apparatus 30. The water valve 54 opens/closes the water-supply pipe 51 on the basis of commands from the control apparatus 30. The water supply-pipe 51 is wound around the heat chamber 22a so that the water flowing in the water supply-pipe 51 is heated by the heat chamber 22a of high temperature in advance. An exhaust pipe 81, one end thereof connected to the heat chamber 22a and the other end opened to outside, penetrates the vaporizer 55. The vaporizer 55 heats the supplied water heated in advance by the combustion gas (exhaust gas) flowing in the exhaust pipe 81 exhausted from the heat chamber 22a to outside. The heated water becomes vapor, and the vapor is supplied to the reaction chamber 21b. Accordingly, the water is heated in advance and supplied to the vaporizer 55. The water is changed into vapor and the vapor is supplied to the reaction chamber 21b. In addition, in the embodiment, the vaporizer 55 and a portion of the water supply-pipe 51 wound around the heat chamber 22a configure a vaporizing portion 56. Further, a temperature sensor 55a for detecting inner temperature of the vaporizer 55 is provided in the vaporizer 55.

The reaction chamber 21b is heated by the combustion gas of the burner 22b, as will be mentioned later. The fuel for reform supplied into the reaction chamber 21b reacts with the vapor supplied into the reaction chamber 21b, being catalyzed by the reforming catalyst 21a (Ru, Ni series catalyst). Then, hydrogen gas and carbon monoxide is generated through the reform of the fuel with the vapor (so called reform reaction with vapor). At the same time, in the reaction chamber 21b, carbon monoxide shift reaction is performed in which the carbon monoxide generated in the process of reform reaction with vapor reacts with vapor and formed into hydrogen gas and carbon dioxide. These gases (so called a reformed gas) is cooled while flowing in the heat-exchanging portion 46 and introduced into the CO-shift portion 23.

In the CO-shift portion 23, carbon monoxide contained in the supplied reformed gas reacts with water vapor, being catalyzed by a catalyst 23a (Cu—Zn series catalyst or the like) filled in the CO-shift portion 23, and is changed into hydrogen gas and carbon dioxide gas, so called a carbon monoxide shift reaction. Accordingly, concentration of the carbon monoxide contained in the extracted reformed gas is lowered.

The reformed gas extracted from the CO-shift portion 23, of which the concentration of carbon monoxide is lowered, is supplied into the CO selective oxidation portion 24. Further, an air supply-pipe 61 connected to an air-source Sa is connected to the CO selective oxidation portion 24. Air for oxidation is supplied from the air source (atmospheric air or the like) Sa to the CO selective oxidation portion 24. A filter 62, an air pump 63, and an air valve 64 are provided at the air supply-pipe 61 in series from upstream. The filter 62 filtrates air. The air pump 63 pumps air from the air source Sa into the CO selective oxidation portion 24. The air pump 63 controls the amount of air supplied on the basis of commands from the control apparatus 30.

Carbon monoxide remained in the reformed gas supplied into the CO selective oxidation portion 24 reacts with air supplied as described above into carbon dioxide, being catalyzed by a catalyst 24a (Ru series, Pt series or the like) filled in the CO selective oxidation portion 24. Accordingly, the concentration of carbon monoxide contained in the reformed gas is further lowered through oxidative reaction (down to 10 ppm or less). Then, the reformed gas is extracted and supplied to the anode 11 of the fuel cell 10. In addition, a temperature sensor 24a1 is provided in the CO selective oxidation portion 24 for detecting temperature of the catalyst 24a. Detection signals of the temperature sensor 24a1 are transmitted to the control apparatus 30.

The CO selective oxidation portion 24 is connected to an inlet of the anode 11 of the fuel cell 10 through a reformed gas supply-pipe 71. Thus, the reformed gas is supplied to the anode 11. An outlet of the anode 11 of the fuel cell 10 is connected to the burner 22b through an off-gas supply-pipe 72. Thus, an off-gas from an anode (the reformed gas containing hydrogen not having been reacted at the anode 11) exhausted from the fuel cell 10 is supplied to the burner 22b. A bypass pipe 73 directly connects the reformed gas supply-pipe 71 and the off-gas supply-pipe 72 bypassing the fuel cell 10. A first reformed gas valve 74 is provided at the reformed gas supply-pipe 71 between a branch point to the bypass pipe 73 and the fuel cell 10. An off-gas valve 75 is provided at the off-gas supply-pipe 72 between a merging point with the bypass pipe 73 and the fuel cell 10. A second reformed gas valve 76 is provided at the bypass pipe 73. The first reformed gas valve 74, the second reformed gas valve 76, and the off-gas valve 75 open/close respective pipes. The first reformed gas valve 74, the second reformed gas valve 76, and the off-gas valve 75 are controlled by the control apparatus 30.

Further, one end of an air supply-pipe 67 branched from the air supply-pipe 61 at the upstream of the air pump 63 is connected to an inlet of the cathode 12 of the fuel cell 10. Thus, air is supplied to the cathode 12. A cathode blower 68, a pressure sensor 85, and an air valve 69 are provided at the air supply-pipe 67 in series from upstream. The cathode blower 68 is driven by a motor 68a for pumping air, in other words, fluid, from an inlet to an outlet, in other words, for blowing air supplied from the air source Sa into the cathode 12 of the fuel cell 10. The cathode blower 68 is controlled on the basis of commands from the control apparatus 30 to control the amount of air supplied to the cathode 12. The cathode blower 68 includes a rotational frequency sensor 68b serving as a drive amount detector for detecting a rotational frequency (an amount of drive) of the motor 68a. Detection signals detected by the rotational frequency sensor 68b are transmitted to the control apparatus 30. The pressure sensor 85 serves as an outlet pressure detector for detecting a pressure of the fluid (air) at the outlet (outlet side) of the cathode blower 68. Detection signals detected by the pressure sensor 85 are transmitted to the control apparatus 30. Further, a temperature sensor 86 is provided close to the cathode blower 68. The temperature sensor 68 serves as an ambient temperature detector for detecting an ambient temperature of the cathode blower 68. Detection signals of the temperature sensor 68 are transmitted to the control apparatus 30. The air valve 69 opens/closes the air supply-pipe 67 on the basis of commands from the control apparatus 30. Further, one end of an exhaust pipe 82, of which the other end is opened to outside, is connected to an outlet of the cathode 12 of the fuel cell 10.

Further, a fuel supply-pipe 47 branched from the fuel supply-pipe 41 at the upstream of the fuel pump 43 is connected to the burner 22b in order for supplying the fuel for combustion (raw fuel gas) to the combustion portion 22. A combustion-fuel pump 48 is provided at the fuel supply-pipe 47. The combustion-fuel pump 48 pumps the fuel from the fuel source Sf toward the burner 22b. The combustion-fuel pump 48 is controlled on the basis of commands from the control apparatus 30 to control the amount of fuel supplied to the burner 22b.

Further, an air supply-pipe 65 branched from the air supply-pipe 61 at the upstream of the air pump 63 is connected to the burner 22b for supplying air serving as an oxidative gas for combusting the fuel, the reformed gas, or off-gas from the anode. A combustion-air pump 66 is provided at the air supply-pipe 65. The combustion-air pump 66 pumps air for combustion supplied from the air source Sa toward the burner 22b. The combustion-air pump 66 is controlled on the basis of commands from the control apparatus 30 for controlling the amount of air for combustion. When the burner 22b is ignited on the basis of commands from the control apparatus 30, the fuel, the reformed gas, or the off-gas from the anode, each supplied to the burner 22b, is combusted. Then, the combustion gas of high temperature is generated. The combustion gas is supplied to the heat chamber 22a, and thus the reaction chamber 21b is heated. Then, the reforming catalyst 21a is heated. The combustion gas having passed the heat chamber 22a is exhausted to outside as an exhaust gas through the exhaust pipe 81 and the vaporizer 55.

Further, a condenser 77 is provided in the middle of the reformed gas supply-pipe 71. A condenser 78 is provided in the middle of the off-gas supply-pipe 72. A condenser 79 is provided in the middle of the exhaust pipe 82. The condenser 77 condenses vapor contained in the reformed gas flowing in the reformed gas supply-pipe 71 to be supplied to the anode 11 of the fuel cell 10. The condenser 78 condenses vapor contained in the off-gas from the anode flowing in the off-gas supply-pipe 72 exhausted from the anode 11 of the fuel cell 10. The condenser 79 condenses vapor contained in the off-gas from the cathode flowing in the exhaust pipe 82 exhausted from the cathode 12 of the fuel cell 10. In addition, each condenser includes a cooling medium pipe. A low temperature liquid stored in a tank or a liquid cooled by a radiator and a cooling fan is supplied to the cooling medium pipe. The vapor contained in each gas is condensed through heat exchange with the liquid.

The condensers 77, 78, 79 are connected to a purifier 95 through a pipe 84. Water condensed in the condensers 77, 78, 79 is introduced to the purifier 95 and collected. The purifier 95 purifies the condensed water, in other words, collected water, supplied from the condensers 77, 78, and 79 by means of ion-exchange resin installed in the purifier 95. Further, the purifier 95 discharges the purified collected water toward the water tank Sw. In addition, a pipe for charging supplement water (tap water) supplied from a tap water-source (tap water pipe or the like) is connected to the purifier 95. When the amount of water stored in the purifier 95 becomes less than lower limitation, tap water is supplied to the purifier 95.

Figure 2:
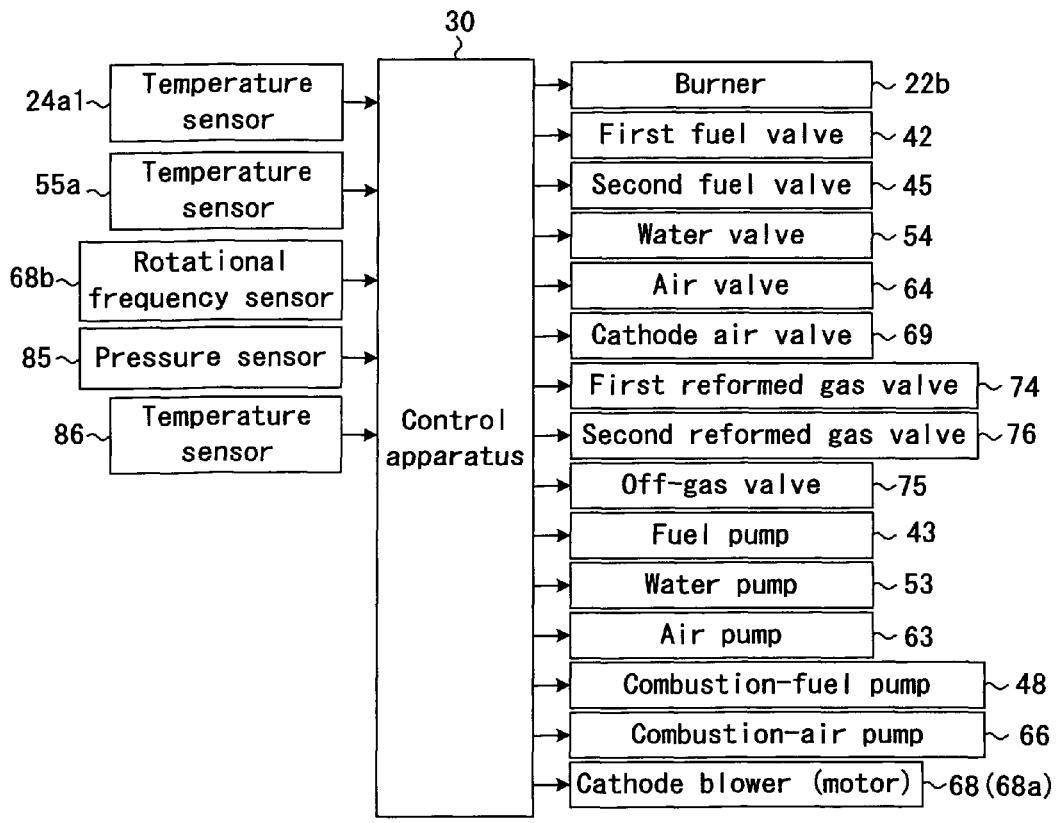
FIG. 2 represents a block diagram illustrating the fuel cell system illustrated in FIG. 1.

Further, the fuel cell system includes the control apparatus (control apparatus for a fluid flow apparatus) 30. The temperature sensors 24a1, 55a, 86, the rotational frequency sensor 68b, the pressure sensor 85, the pumps 43, 48, 53, 63, 66, the blower 68, the valves 42, 45, 54, 64, 69, 74, 75, 76, and the burner 22b are connected to the control apparatus 30 (Please refer to FIG. 2). In addition, the statement "the pumps 43, 48, 53, 63, 66, and the blower 68 are connected to the control apparatus 30" means that respective drive sources (for example, motors) for driving the pumps and the blower are connected to the control apparatus 30.

The control apparatus 30 includes a microcomputer (not illustrated). The microcomputer includes an input/output interface, a central processing unit (CPU), a random access memory (RAM), and a read only memory (ROM), each of them connected by busses with others. The CPU feeds signals of temperatures transmitted from the temperature sensors 24a1, 55a, and 86, signals of the rotational frequency transmitted from the rotational frequency sensor 68b, and signals of outlet pressure transmitted from the pressure sensor 85. On the basis of signals described above, the CPU controls the pumps 43, 48, 53, 63, 66, the blower 68, the valves 42, 45, 54, 64, 69, 74, 75, 76, and the burner 22b. Thus, for obtaining preferable current output (current, power consumed by the load apparatus), the amount of the fuel for reform, the amount of the fuel for combustion, the amount of air for combustion, the amount of the water for reform, and the amount of air for cathode are controlled. The RAM temporary stores variables required for performing a program of controls described above. The ROM stores the program.

Figure 3:
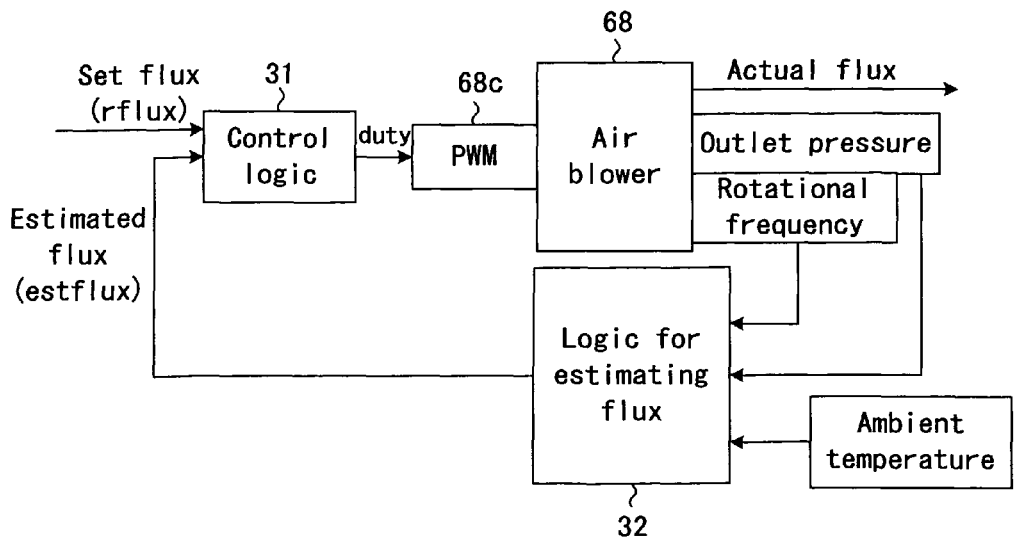
FIG. 3 represents a block diagram illustrating a control apparatus illustrated in FIG. 2.

As illustrated in FIG. 3, the control apparatus 30 includes a control logic portion 31 and a logic portion 32 for estimating a flux. Here, the control logic portion 31 and the logic portion 32 for estimating flux will be explained taking a case of controlling the cathode blower 68. Similar explanations can be made for cases of controlling the fuel pump 43, the combustion-fuel pump 48, the combustion-air pump 66, the air pump 63, and the water pump 53, or the like. The control logic portion 31 feeds a set flux rflux and an estimated flux estflux transmitted from the logic portion 32 for estimating a flux. Then, the control logic portion 31 calculates a duty ratio duty of the motor 68a on the basis of the set flux rflux and the estimated flux estflux and transmits the calculated duty ratio duty to a driver circuit 68c of the motor 68a. By doing so, the motor 68a is controlled on the basis of a pulse width modulation (PWM) control with the calculated duty ratio duty (The motor 68 is controlled by pulses with constant pulse levels and varying pulse widths according to the duty ratio). The set flux rflux is a target flux, the estimated flux estflux is an estimated flux, and the duty ratio duty is an amount of control. The set flux rflux is calculated on the basis of the level of current or the amount of power, consumed at a load apparatus to which electric power is supplied from the fuel cell system, and a fuel supply map stored in advance. The fuel supply map indicates correlations between the level of current or the amount of power and each of the amount of the fuel for reform, the fuel for combustion, the air for combustion, the reformed water and the cathode air (command values for supply).

The logic portion 32 for estimating a flux feeds a rotational frequency rev of the motor 68a, an outlet pressure press of the motor 68a, and an ambient temperature rtemp of the motor 68a, calculates the estimated flux estflux on the basis of the fed values, and transmits the calculated estimated flux estflux to the control logic portion 31.

Figure 4A:
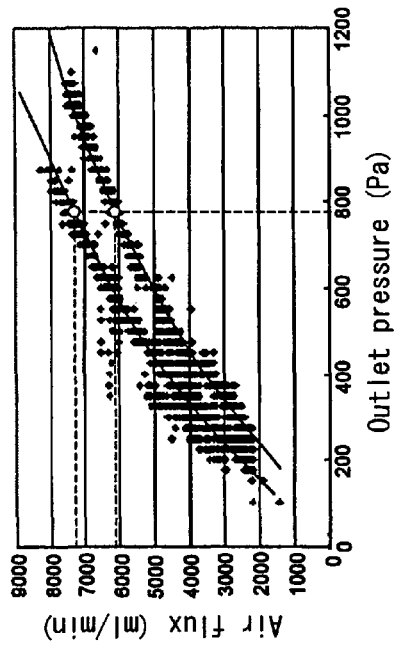
FIGS. 4A to 4C represent graphs illustrating correlations between an estimated flux, a rotational frequency and an outlet pressure.
Figure 4B:
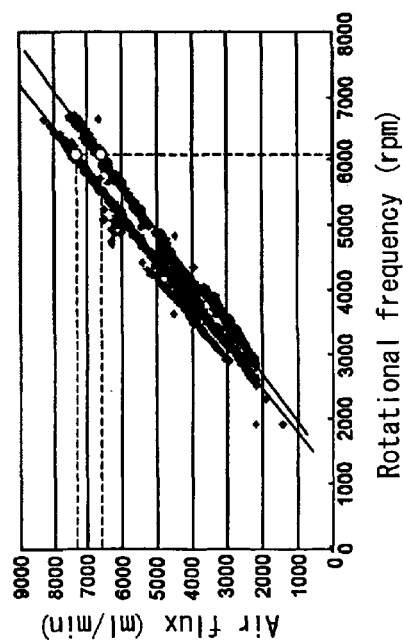
Figure 4C:
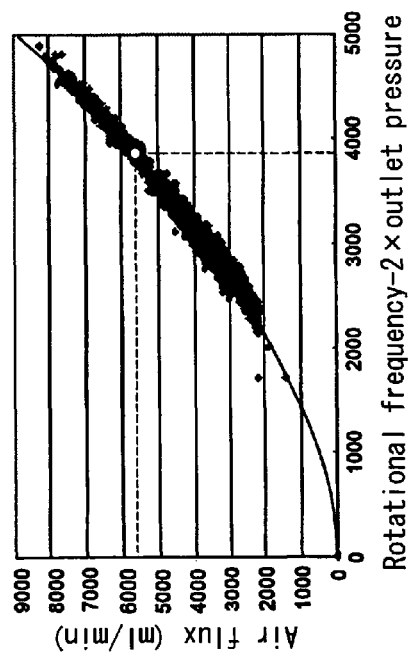

Next, the reason will be explained why the estimated flux estflux can be calculated on the basis of the rotational frequency rev of the motor 68a and the outlet pressure press of the motor 68a. The inventors expected that, when assuming the amount of air (fluid) flowing from the cathode blower 68 (calculating the estimated flux), the amount of flow (flux) would correlate parameters in relation to operation or the operated result of the cathode blower 68, in other words, the rotational frequency rev and the outlet pressure press. Accordingly, the inventors measured the amount of air (fluid) flowing from the cathode blower 68 (air flux) when the rotational frequency rev varies, utilizing machines. Incidentally, a flow meter was provided at the outlet of the cathode blower 68 for measuring the amount of air (fluid) flowing from the cathode blower 68. FIG. 4A represents a graph showing results of the test. As can be clearly seen from FIG. 4A, the air flux does not correlate with the rotational frequency rev one-to-one. This is because the air flux when the rotational frequency rev rises is different from that when the rotational frequency rev falls. In other words, the air flux is influenced from hysteresis. In addition, the inventor measured the amount of air (fluid) flowing from the cathode blower 68 (air flux) when the outlet pressure press varies, utilizing machines. Incidentally, a flow meter was provided at the outlet of the cathode blower 68 for measuring the amount of air (fluid) flowing from the cathode blower 68. FIG. 4B represents a graph showing results of the test. As can be clearly seen from FIG. 4B, the air flux does not correlate with the outlet pressure press one-to-one. This is because the air flux when the outlet pressure press rises is different from that when the outlet pressure press falls. In other words, the air flux is influenced from hysteresis. For overcoming this inexpediency, the inventor made various functions having the rotational frequency rev and the outlet pressure press as variables. For obtaining the relation between the air flux and each of constructed functions, the air flux was measured when the rotational frequency rev and the outlet pressure press were varied. Thus, the inventor found a function that was not influenced from hysteresis from various functions having the rotational frequency rev and the outlet pressure press as variables. In other words, the inventor found that the air flux correlates one-to-one with a square of difference between the rotational frequency rev and the outlet pressure press multiplied by a predetermined constant. FIG. 4C represents a graph showing a one-to-one relation between the air flux and the function. In FIG. 4C, the predetermined constant is 2.

Figure 5:
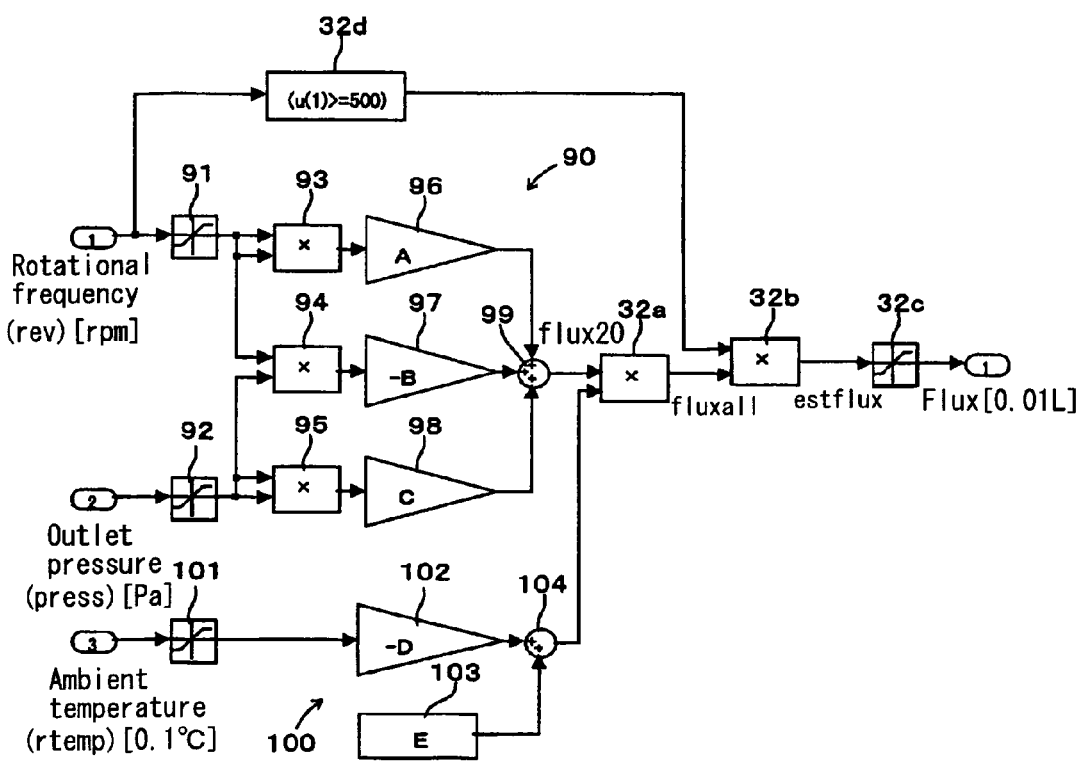
FIG. 5 represents a block diagram illustrating a logic portion for estimating flux illustrated in FIG. 3.

Now, explanations will be back to the logic portion 32 for estimating flux. The logic portion 32 for estimating flux includes, as illustrated in FIG. 5, a portion 90 for calculating a standard estimated flux that calculates the standard estimated flux flux20, in other words, a standard estimated outlet flux, and a portion 100 for calculating temperature-correcting value that calculates a temperature-correcting value. The portion 90 for calculating a standard estimated flux includes limiters 91, 92 for restricting upper and lower limits, multipliers 93-98, and an adder 99. The limiter 91 for restricting upper and lower limits feeds the rotational frequency rev. If the fed signal of the rotational frequency rev is within a predetermined range, the limiter 91 transmits the fed signal to the multiplier 93 and the multiplier 94 without change. If the fed signal of the rotational frequency rev is outside the predetermined range, the limiter 91 transmits a signal of an upper limit or a lower limit of the predetermined range. The limiter 92 for restricting upper and lower limits feeds the outlet pressure press. If the fed signal of the outlet pressure press is within a predetermined range, the limiter 92 transmits the fed signal to the multiplier 94 and the multiplier 95 without change. If the fed signal of the outlet pressure press is outside the predetermined range, the limiter 92 transmits a signal of an upper limit or a lower limit of the predetermined range. The multiplier 93 squares the rotational frequency rev fed from the limiter 91 and transmits the result to the multiplier 96. The multiplier 94 multiplies the rotational frequency rev and the outlet pressure press fed from the limiter 91 and the limiter 92 respectively and transmits the result to the multiplier 97. The multiplier 95 squares the outlet pressure press fed from the limiter 92 and transmits the result to the multiplier 98. The multiplier 96 multiplies a coefficient A and the square of the rotational frequency rev fed from the multiplier 93 and transmits the result to the adder 99. The multiplier 97 multiplies a coefficient B and the product of the rotational frequency rev and the outlet pressure press fed from the multiplier 94 and transmits the result to the adder 99. The multiplier 98 multiplies a coefficient C and the square of the outlet pressure press fed from the multiplier 95 and transmits the result to the adder 99. The adder 99 sums up products fed from the multipliers 96 to 98 and transmits the result as the standard estimated flux flux20 to the multiplier 31*a*. As described above, the standard estimated flux flux20, in other words, the standard estimated outlet flux, can be calculated on the basis of the rotational frequency rev and the outlet pressure press.

The portion 100 for calculating temperature-correcting value includes a limiter 101 for restricting upper and lower limits, a multiplier 102, a memory 103, and an adder 104. The limiter 101 feeds a surrounding temperature, in other words, an ambient temperature, rtemp. If the fed signal of the surrounding temperature is within a predetermined range, the limiter 101 transmits the fed signal to the multiplier 102. If the fed signal of the surrounding temperature is outside the predetermined range, the limiter 101 transmits a signal of an upper limit or a lower limit of the predetermined range. The multiplier 102 multiplies a coefficient D and the surrounding temperature fed from the limiter 101 and transmits the result to the adder 104. The memory 103 stores the pre-recorded coefficient E. The adder 104 sums up the product and the coefficient E fed from the multiplier 102 and the memory 103 respectively and transmits the result to the multiplier 31*a* as a temperature corrected value.

The coefficients A, B and C are determined as follows. As described above, the estimated flux estflux correlates with the square of the difference between the rotational frequency rev and the outlet pressure press multiplied by a predetermined constant and indicated by a quadratic function with the variables, the rotational frequency rev and the outlet pressure press. Accordingly, the standard estimated flux flux20 can be indicated by an equation 1.

$$\text{Standard estimated flux flux20} = A \cdot \text{Rotational frequency rev}^2 + B \cdot \text{Rotational frequency rev} \cdot \text{outlet pressure press} + C \cdot \text{outlet pressure press}^2 \quad \text{(Equation 1)}$$

Then, the cathode blower 68 is operated while the ambient temperature (surrounding temperature) of the cathode blower 68 is constantly retained at a standard temperature (for example, 20° C.). An actual flux, in other words, the amount of flow of the fluid flowing from the cathode blower 68, the rotational frequency rev, and the outlet pressure press are measured. Then, with the measured data and the equation 1 described above, the coefficients A, B, and C are calculated on the basis of a linear programming problem (for example, least squares method). At this time, the standard estimated flux flux20 in the left side of the equation 1 is substituted by the actual flux. Thus, the coefficients A, B, and C are calculated. Accordingly, the standard estimated flux flux20 can be calculated on the basis of the rotational frequency rev and the outlet pressure press with use of the equation 1. Incidentally, the coefficients A, B, C are positive, negative, positive values respectively. Next, the coefficients D and E described above are determined as follows. From experiments, it is known that the flux from the cathode blower 68 declines as the ambient temperature rises, and the relation between the flux and the ambient temperature is an inverse proportion. In other words, if the flux is W at the standard temperature (20° C.) and is kW at a certain temperature (40° C.), simultaneous equations indicated as equations 2 can be formed. In the equations, k is a coefficient greater than 0 and less than 1.

$$W = 20 \times D + E$$

$$kW = 40 \times D + E \quad \text{(Equations 2)}$$

When the equations 2 are solved, the coefficients D and E are calculated as following equations 3.

$$D = (-(1-k)/20) \times W$$

$$E = (2-k)W \quad \text{(Equations 3)}$$

Accordingly, the flux WTh when the ambient temperature is rtemp can be written as following equation 4.

$$WTh = (rtemp \times (-(1-k)/20) + (2-k)) \times W \quad \text{(Equation 4)}$$

Accordingly, it can be found that the flux WTh when the temperature is rtemp is the flux W when the temperature is 20° C. multiplied by (rtemp×(−(1−k)/20)+(2−k)). In other words, the temperature-correcting value can be calculated as Th×(−(1−k)/20)+(2−k). The temperature-correcting value can be indicated by the coefficients D and E as rtemp×D/W+E/W. Incidentally, the coefficients D and E are negative and positive values respectively.

The logic portion 32 for estimating flux further includes a multipliers 32a and 32b, a limiter 32c for restricting upper and lower limits, and a noise canceller 32d. The multiplier 32a multiplies the standard estimated flux flux20 fed from the portion 90 for calculating a standard estimated flux and the temperature-correcting value fed from the portion 100 for calculating a temperature-correcting value, calculates a temperature-corrected estimated flux fluxall, and transmits the result to the multiplier 32b. Thus, the standard estimated flux flux20 is corrected on the basis of the ambient temperature. The temperature-corrected estimated flux fluxall can be correctly estimated (calculated) over all temperature range at which the cathode blower 68 would be installed.

The noise canceller 32d feeds the rotational frequency rev. If the rotational frequency rev is a predetermined value (for example, 500 rpm) or less, the noise canceller 32d transmits "0" to the multiplier 32b. In contrast, if the rotational frequency rev is greater than the predetermined value, the noise canceller 32d transmits "1" to the multiplier 32b. The multiplier 32b multiplies the temperature-corrected estimated flux fluxall and the value fed from the noise canceller 32d ("0" or "1") and transmits the result as the estimated flux estflux to the limiter 32c for restricting upper and lower limits. Accordingly, if the rotational frequency rev is a predetermined value (for example, 500 rpm) or less, the multiplier 32b transmits "0" as the estimated flux estflux. In contrast, if the rotational frequency rev is greater than the predetermined value, the multiplier 32b transmits the temperature-corrected estimated flux fluxall as the estimated flux estflux. Then, the limiter 32c feeds the estimated flux estflux. If the fed signal of the estimated flux estflux is within a predetermined range, the limiter 32c transmits the fed signal to the control logic portion 31 illustrated in FIG. 3 without change. If the fed signal of the estimated flux estflux is outside the predetermined range, the limiter 32c transmits a signal of an upper limit or a lower limit of the predetermined range.

Next, operations of the fuel cell system described above will be explained. When a start switch (not illustrated) is turned on at the time t0, the control apparatus 30 starts start-up operations of the fuel cell system. The control apparatus 30 commands the first reformed gas valve 74 and the off-gas valve 75 to close, and commands the second reformed gas valve 76 to open, so that the CO selective oxidation portion 24 is connected to the burner 22. Then, the control apparatus 30 commands the first fuel valve 42 to open, commands the second fuel valve 45 to close, and commands the combustion-fuel pump 48 and the combustion-air pump 66 to operate, so that the fuel and air for combustion are supplied to the burner 22b. Then, the control apparatus 30 commands the burner 22b to ignite. Accordingly, the fuel is combusted, and the combustion gas heats the reforming catalyst 21a included in the reforming portion 21 and the vaporizer 55.

The control apparatus 30 detects the temperature of the vaporizer 55 by means of the temperature sensor 55a. When the detected temperature becomes to a first predetermined temperature Th1 or higher (at the time t1), the control apparatus 30 commands the water valve 54 to open, and commands the water pump 53 to operate, so that a predetermined flux of water (a predetermined amount of water to be supplied) contained in the water tank Sw is supplied to the reforming portion 21 through the vaporizer 55.

The control apparatus 30 starts counting time when the temperature of the vaporizer 55 becomes the first predetermined temperature Th1 or higher (at the time t1). If the counted time becomes a first predetermined time T1 (1 minute or the like) or more, the control apparatus 30 commands the second fuel valve 45 to open, and commands the fuel pump 43 to operate, so that a predetermined flux of the fuel (a predetermined amount of the fuel) from the fuel source Sf is supplied to the reforming portion 21. At the same time, the control apparatus 30 commands the air valve 64 to open, and commands the air pump 63 to operate, so that a predetermined flux of the air (the predetermined amount of the air) from the air source Sa is supplied to the CO selective oxidation portion 24. Accordingly, the mixed gas of the fuel for reform and vapor is supplied to the reforming portion 21. In the reforming portion 21, the reformed gas is generated through the reform reaction and the carbon monoxide shift reaction described above. Then, the reformed gas extracted from the reforming portion 21 passes through the CO-shift portion 23 and the CO selective oxidation portion 24. While the reformed gas passes through the CO-shift portion 23 and the CO selective oxidation portion 24, the concentration of carbon monoxide is lowered. After that, the reformed gas is extracted from the CO selective oxidation portion 24. Then, the reformed gas is supplied to the burner 22b of the combustion portion 22, and combusted.

While the reformed gas is generated, the control apparatus 30 detects the temperature of the catalyst 24a of the CO selective oxidation portion 24 by means of the temperature sensor 24a1. When the detected temperature becomes a second predetermined temperature Th2 or higher (at the time t4), the control apparatus 30 commands the first reformed gas valve 74 and the off-gas valve 75 to open, and commands the second reformed gas valve 76 to close, so that the CO selective oxidation portion 24 is connected to the inlet of the anode 11 of the fuel cell 10, and that the outlet of the anode 11 of the fuel cell 10 is connected to the burner 22b. Accordingly, the start-up operations for warming up the fuel cell system are completed. Next, normal operations of the fuel cell system are started.

The control apparatus 30 starts the normal operations of the fuel cell system (operation mode for generating electricity by the fuel cell 10). At this time, the fuel for reform, the fuel for combustion, the air for combustion, the air for oxidation, air for cathode, and water utilized for reform are controlled so as to generate a desired output current (current or power consumed by a load apparatus). The control apparatus 30 calculates the amount of the fuel for reform by which the desired output current is obtained, and commands the fuel pump 43 to operate so that the calculated amount of the fuel for reform is supplied. Then, the control apparatus 30 calculates the amount of the water utilized for reform on the basis of the calculated amount of the fuel for reform and a ratio of steam to carbon (S/C ratio). The control apparatus 30 commands the water pump 53 to operate so that the calculated amount of the water is supplied. When sufficient heat energy required by the combustion portion 22 cannot be obtained only by the combustion heat of the off-gas from the anode, or when the fuel cell system is performing the start-up operations, the control apparatus 30 calculates the required amount of the fuel for combustion, and commands the combustion-fuel pump 48 to operate so that the calculated amount of the fuel is supplied. Then, the control apparatus 30 calculates the required amount of the air for combustion on the basis of the amount of the fuel for reform, or the like. Then, the control apparatus 30 commands the combustion-air pump 66 to operate so that the calculated amount of the air is supplied. Further, the control apparatus 30 calculates the amount of the air required to lower the amount of the carbon monoxide to a predetermined amount or lower. Then, the control apparatus 30 commands the air pump 63 to operate so that the calculated amount of the air for oxidation is supplied. Then, the control apparatus 30 calculates the required amount of the air supplied to the cathode sufficient to react with the reformed gas supplied from the reforming apparatus 20. Then, the control apparatus 30 commands the cathode blower 68 to operate so that the calculated amount of the air is supplied. When a stop switch is pushed, the fuel cell system stops the operation.

Further, operations of the cathode blower 68 on the basis of the calculation of the estimated flux of the cathode blower 68 and the calculated results of the estimated flux will be explained with reference to a flow chart illustrated in FIG. 6. When the start switch (not illustrated) is turned on, the control apparatus 30 repeatedly runs a program according to the flow chart by every predetermined short period. Every time the control apparatus 30 starts running the program in the step 200 illustrated in FIG. 6, the control apparatus 30 feeds the rotational frequency rev of the cathode blower 68 detected by the rotational sensor 68b, feeds the outlet pressure press of the cathode blower 68 detected by the pressure sensor 85, and feeds the ambient temperature (surrounding temperature) rtemp of the cathode blower 68 detected by the temperature sensor 86 (step 202).

In step 204, the control apparatus 30 calculates the standard estimated flux flux20 on the basis of the rotational frequency rev and the outlet pressure press, both detected in the step 202, utilizing the equation 1. In step 206, the control apparatus 30 calculates a temperature-correcting value on the basis of the ambient temperature rtemp detected in the step 202, utilizing the equation described above for calculating the temperature-correcting value, $(rtemp \times (-(1-k)/20)+2-k))$. Then, the control apparatus 30 multiplies the temperature-correcting value and the standard estimated flux flux20 calculated in advance, for correcting the standard estimated flux flux20 according to the ambient temperature. The control apparatus 30 thus calculates the temperature-corrected estimated flux fluxall.

In step 208, if the rotational frequency rev is a predetermined value (DEADZONE, for example, 500 rpm) or less, the control apparatus 30 calculates the estimated flux estflux as "0". If the rotational frequency rev is greater than the predetermined value, the control apparatus 30 calculates the estimated flux estflux as the temperature-corrected estimated flux fluxall.

In step 210, the control apparatus 30 feeds the set flux rflux separately calculated. In step 212, the control apparatus 30 calculates, on the basis of the fed set flux rflux and the estimated flux estflux calculated in the step 208, the duty ratio duty (the amount of control controlled by a feedback control) of the motor 68a, which is the amount of control that makes the estimated flux estflux follow the set flux rflux. Then, in step 214, the control apparatus 30 transmits the duty ratio duty of the motor 68a calculated in the preceding step to the driver circuit 68c of the rotor 68a to operate the cathode blower 68. Then, in the control apparatus 30, the program proceeds to step 216, the end of the program.

Figure 7:
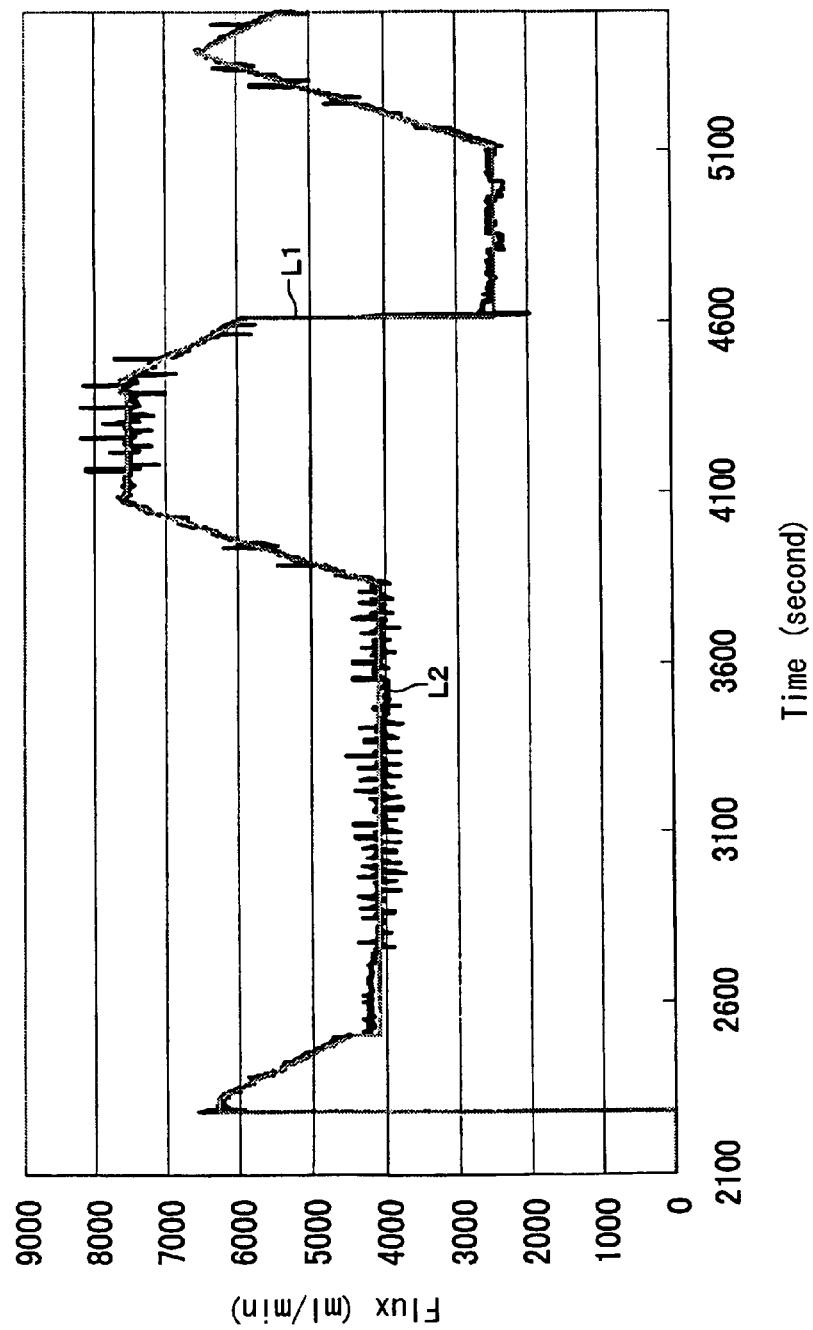
FIG. 7 represents a graph illustrating an actual flux measured while the flux of the cathode blower is controlled with use of the estimated flux of the cathode blower.

Thus, the estimated flux of the cathode blower 68 was estimated. Then, an actual flux of the cathode blower 68 was measured while the flux of the cathode blower 68 was controlled with use of the estimated flux. FIG. 7 represents a graph showing a set flux rflux, indicated by a relatively pale curve L1, and the actual flux, indicated by a relatively dense curve L2. The actual flux can be considered as the estimated flux. Incidentally, because the curves L1 and L2 partly overlap each other, only the curve L1 is exhibited at the part where those curves are overlapping. As can be clearly seen from FIG. 7, the actual flux, in other words, the estimated flux, nicely follows the set flux rflux. Accordingly, the flux of the fluid can be controlled with high accuracy.

As can be clearly seen from the explanation described above, in the embodiment, the estimated flux-calculating apparatus (the logic portion 32 for estimating flux illustrated in FIG. 3, steps 202 to 208 illustrated in FIG. 6) calculates the flux of the fluid flowing from the fluid flow apparatus (cathode blower 68) as the estimated flux estflux on the basis of the pressure of the fluid detected by the outlet pressure detector (pressure sensor 85) and the amount of drive detected by the drive amount detector (rotational frequency sensor 68d). The control amount-calculating apparatus (the control logic portion 31 illustrated in FIG. 3, step 212 illustrated in FIG. 6) calculates the amount of control (duty ratio duty) of the fluid flow apparatus (cathode blower 68) on the basis of the estimated flux estflux calculated by the estimated flux-calculating apparatus and the target flux rflux. The control apparatus (the control logic portion 31 illustrated in FIG. 3, step 214 illustrated in FIG. 6) controls the drive source (motor 68a) on the basis of the amount of control (duty ratio duty) calculated by the control amount-calculating apparatus. Accordingly, the flux of the fluid flowing from the fluid flow apparatus (cathode blower 68) can be estimated accurately, without use of high-cost and large-size mass flow meter, with use of a conventional sensor. Then, on the basis of the estimated results, the flux of the fluid can be controlled with high accuracy. Accordingly, a control apparatus for a fluid flow apparatus can be provided, which is small in size and low in cost, and which can control the fluid flow apparatus with high accuracy.

Figure 6:
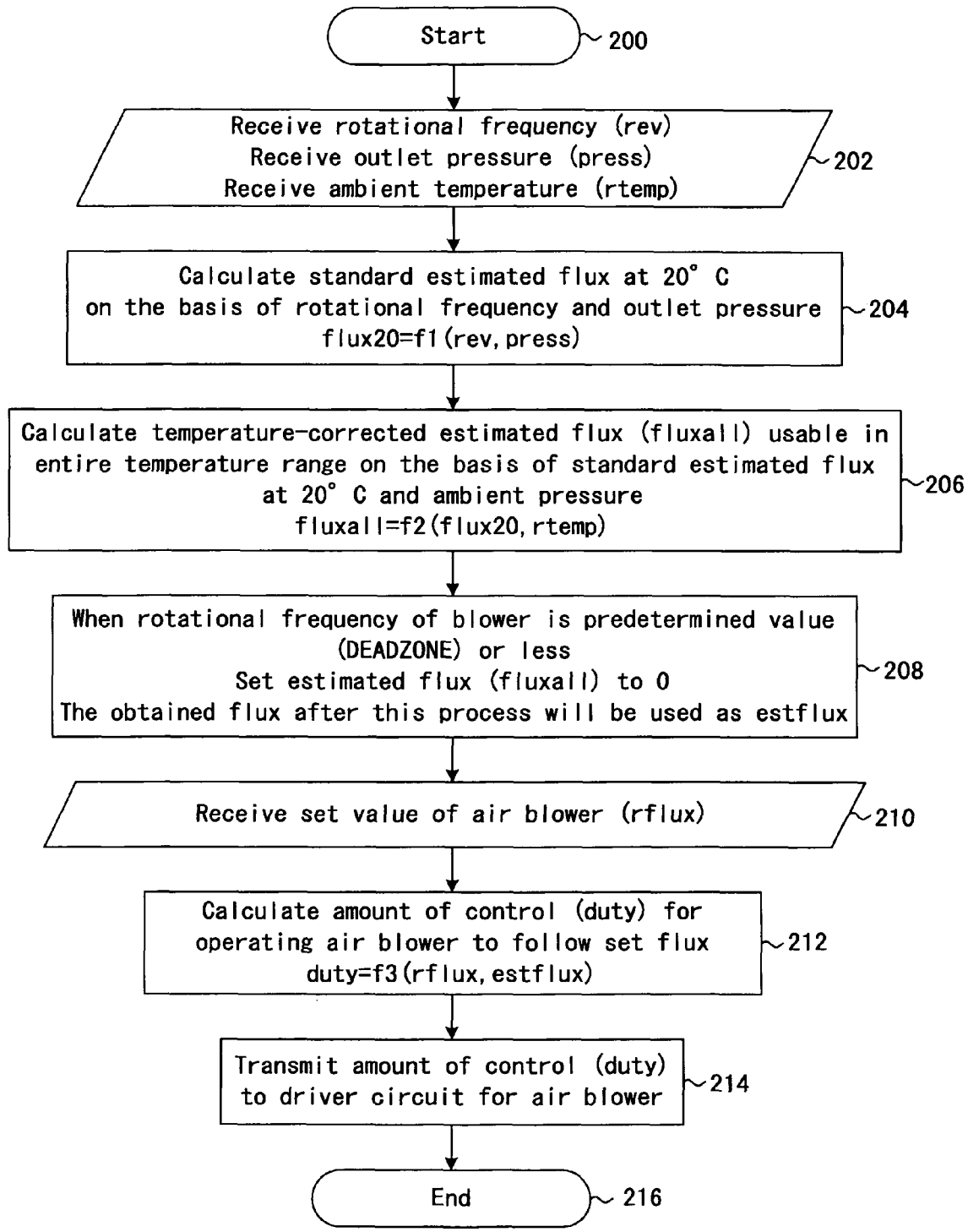
FIG. 6 represents a flow chart illustrating a control program run by the control apparatus 30 illustrated in FIG. 2.

Further, the correcting apparatus (the portion 100 for calculating the temperature-correcting value and multiplier 32a illustrated in FIG. 5, step 206 illustrated in FIG. 6) corrects the standard estimated flux flux20 calculated by the estimated flux-calculating apparatus (a portion 90 for calculating a standard estimated flux illustrated in FIG. 5, steps 202 and 204 illustrated in FIG. 6) on the basis of the ambient temperature detected by the ambient temperature detector (temperature sensor 86). Accordingly, the estimated flux estflux suitable for the ambient temperature of the fluid flow apparatus (cathode blower 68) can be calculated. Thus, the estimated flux can be calculated with higher degree of reliability. Accordingly, the flux of the fluid can be controlled on the basis of the results of the calculated estimated flux with higher accuracy.

In addition, because the fuel cell system includes the control apparatus 30 of the fluid flow apparatus (cathode blower 68), the flux of the fluid flowing from the fluid flow apparatus (cathode blower 68) can be assumed with high accuracy, without use of high-cost and large-size mass flow meter, with use of a conventional sensor, and the flux of the fluid can be controlled with high accuracy on the basis of the estimated results of the flux of the fluid. Accordingly, a fuel cell system, which is small in size, low in cost, and which can be controlled with high accuracy, can be provided.

Incidentally, in the embodiment described above, a blower is employed as the fluid flow apparatus. However, it is not limited. Anything can be employed which is driven by a drive source, and which feeds fluid (irrespective of liquid and/or gas) from an inlet and letting the fluid flow out from an outlet. For example, a pump can be employed. In this case, the pump can be controlled as similar way as in the blower.

Further, it is possible that the drive source of the fluid flow apparatus be configured from something other than motors. At this time, it is preferable if the amount of drive of the drive source can be detected.

Further, it is possible that the pumps 43, 63, 48, 66 for letting the fluid flow out be substituted by blowers which are similar to the cathode blower 68.

According to a first aspect of the present invention, a flux control apparatus includes an outlet pressure detector for detecting an outlet pressure of a fluid at an outlet of a fluid flow apparatus driven by a drive source for feeding the fluid from an inlet of the fluid flow apparatus and letting the fluid flow out from the outlet of the fluid flow apparatus, a drive amount detector for detecting an amount of drive of the drive source, an estimated flux-calculating apparatus for calculating a flux of the fluid flowing from the fluid flow apparatus as an estimated flux on the basis of the pressure of the fluid and the amount of drive detected by the outlet pressure detector and the drive amount detector respectively, a control amount-calculating apparatus for calculating an amount of control for the fluid flow apparatus on the basis of the estimated flux calculated by the estimated flux-calculating apparatus and a target flux, and a control apparatus for controlling the drive source on the basis of the amount of control calculated by the control amount-calculating apparatus.

According to a second aspect of the present invention, the flux control apparatus according to the first aspect further includes an ambient temperature detector for detecting an ambient temperature of the fluid flow apparatus and a correcting apparatus for correcting the estimated flux calculated by the estimated flux-calculating apparatus on the basis of the ambient temperature detected by the ambient temperature detector.

According to a third aspect of the present invention, a fuel cell system includes the flux control apparatus according to the first aspect or the second aspect.

According to the first aspect of the present invention, the estimated flux-calculating apparatus calculates a flux of the fluid flowing from the fluid flow apparatus as an estimated flux on the basis of the pressure of the fluid detected by the outlet pressure detector and the amount of drive detected by the drive amount detector. The control amount-calculating apparatus calculates the amount of control of the fluid flow apparatus on the basis of the estimated flux calculated by the estimated flux-calculating apparatus and a target flux. The control apparatus controls the drive source on the basis of the amount of control calculated by the control amount-calculating apparatus. Accordingly, the flux of the fluid flowing from the fluid flow apparatus can be estimated with high accuracy without use of a high-cost and large-size mass flow meter, and with use of a conventional sensor. Then, on the basis of the estimated results, the flux of the fluid can be controlled with high accuracy. Accordingly, a control apparatus for a fluid flow apparatus, which can control the fluid flow apparatus with high accuracy, and which is low in cost and small in size, can be provided.

According to the second aspect of the present invention, the correcting apparatus corrects the estimated flux calculated by the estimated flux-calculating apparatus on the basis of the ambient temperature detected by the ambient temperature detector. Accordingly, because the estimated flux suitable for the ambient temperature of the fluid flow apparatus can be calculated, the estimated flux can be calculated with higher reliability, and on the basis of the estimated flux, the flux of the fluid can be controlled with higher accuracy.

According to the third aspect of the present invention, because the fuel cell system includes the control apparatus for the fluid flow apparatus, the flux of the fluid flowing from the fluid flow apparatus can be estimated with high accuracy, without use of a high-cost and large-size mass flow meter, with use of a conventional sensor. Then, the flux of the fluid can be controlled with high accuracy on the basis of the estimated results. Accordingly, a fuel cell system can be provided, which can be controlled with high accuracy, and which is small in size and low in cost.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A flux control apparatus, comprising:
   an outlet pressure detector that detects an outlet pressure of a fluid at an outlet of a fluid flow apparatus driven by a drive source for feeding the fluid from an inlet of the fluid flow apparatus and letting the fluid flow out from the outlet of the fluid flow apparatus;
   a drive amount detector that detects an amount of drive of the drive source;
   an ambient temperature detector that detects an ambient temperature of the fluid flow apparatus;
   an estimated flux-calculating apparatus that calculates a flux of the fluid flowing from the fluid flow apparatus as an estimated flux on the basis of the pressure of the fluid and the amount of drive detected by the outlet pressure detector and the drive amount detector respectively;
   a correcting apparatus that corrects the estimated flux calculated by the estimated flux-calculating apparatus on the basis of the ambient temperature detected by the ambient temperature detector;
   a control amount-calculating apparatus that calculates an amount of control for the fluid flow apparatus on the basis of the estimated flux calculated by the estimated flux-calculating apparatus and a target flux; and
   a control apparatus that controls the drive source on the basis of the amount of control calculated by the control amount-calculating apparatus.

2. The flux control apparatus according to claim 1, wherein the fluid flow apparatus is a blower.

3. The flux control apparatus according to claim 1, wherein the fluid flow apparatus is a pump.

4. The flux control apparatus according to claim 1, wherein the estimated flux-calculating apparatus calculates the estimated flux on the basis of a square of a difference between the amount of drive of the drive source and the outlet pressure of the fluid flow apparatus multiplied by a predetermined constant.

5. A fuel cell system comprising the flux control apparatus according to claim 1.

6. A fuel cell system, comprising:
- a fuel cell including an anode to which a fuel gas is supplied and a cathode to which an oxidative gas is supplied;
- a fluid flow apparatus for supplying the oxidative gas to the cathode; and
- the flux control apparatus according to claim 1 for controlling the fluid flow apparatus.

7. The fuel cell system according to claim 6, wherein the fluid flow apparatus is a blower.

8. A fuel cell system, comprising:
- a fuel cell including an anode to which a fuel gas is supplied and a cathode to which an oxidative gas is supplied;
- a reforming apparatus for reforming a raw fuel gas into the fuel gas, the reforming apparatus including a reforming portion for reforming the raw fuel gas and a combustion portion for heating the reforming portion;
- a fluid flow apparatus for supplying the raw fuel gas to the reforming portion; and
- the flux control apparatus according to claim 1 for controlling the fluid flow apparatus.

9. A fuel cell system, comprising:
- a fuel cell including an anode to which a fuel gas is supplied and a cathode to which an oxidative gas is supplied;
- a reforming apparatus for reforming a raw fuel gas into the fuel gas, the reforming apparatus including a reforming portion for reforming the raw fuel gas and a combustion portion for heating the reforming portion;
- a fluid flow apparatus for supplying the raw fuel gas for combustion to the combustion portion; and
- the flux control apparatus according to claim 1 for controlling the fluid flow apparatus.

10. A fuel cell system, comprising:
- a fuel cell including an anode to which a fuel gas is supplied and a cathode to which an oxidative gas is supplied;
- a reforming apparatus for reforming a raw fuel gas into the fuel gas, the reforming apparatus including a reforming portion for reforming the raw fuel gas and a combustion portion for heating the reforming portion;
- a fluid flow apparatus for supplying the oxidative gas for combustion to the combustion portion; and
- the flux control apparatus according to claim 1 for controlling the fluid flow apparatus.

11. A fuel cell system, comprising:
- a fuel cell including an anode to which a fuel gas is supplied and a cathode to which an oxidative gas is supplied;
- a reforming apparatus for reforming a raw fuel gas into the fuel gas, the reforming apparatus including a reforming portion for reforming the raw fuel gas, a combustion portion for heating the reforming portion, and a carbon monoxide selective oxidation portion for diminishing carbon monoxide in a gas extracted from the reforming portion through a selective oxidative reaction;
- a fluid flow apparatus for supplying air for oxidation to the carbon monoxide selective oxidation portion; and
- the flux control apparatus according to claim 1 for controlling the fluid flow apparatus.

12. A fuel cell system, comprising:
- a fuel cell including an anode to which a fuel gas is supplied and a cathode to which an oxidative gas is supplied;
- a condenser for collecting water vapor contained in a gas flowing in the fuel cell system as a collected water;
- a fluid flow apparatus for feeding the collected water from an inlet of the fluid flow apparatus and letting the collected water out from the outlet of the fluid flow apparatus; and
- the flux control apparatus according to claim 1 for controlling the fluid flow apparatus.

13. The fuel cell system according to claim 12, wherein the condenser collects a water vapor from an off-gas of the fuel gas exhausted from the anode.

14. The fuel cell system according to claim 12, wherein the condenser is provided at an exhaust pipe for the oxidative gas exhausted from the cathode.

15. The fuel cell system according to claim 12, further comprising:
- a reforming apparatus for reforming a raw fuel gas into the fuel gas; and
- a fuel gas supply-pipe for supplying the fuel gas from the reforming apparatus to the anode, wherein
- the condenser is provided at the fuel gas supply-pipe.

16. The fuel cell system according to claim 12, wherein the fluid flow apparatus is a pump.

* * * * *